J. H. HODDE & O. WHITE.
POLYPHASE WATT HOUR METER.
APPLICATION FILED MAR. 12, 1913.

1,260,381.

Patented Mar. 26, 1918.
3 SHEETS—SHEET 1.

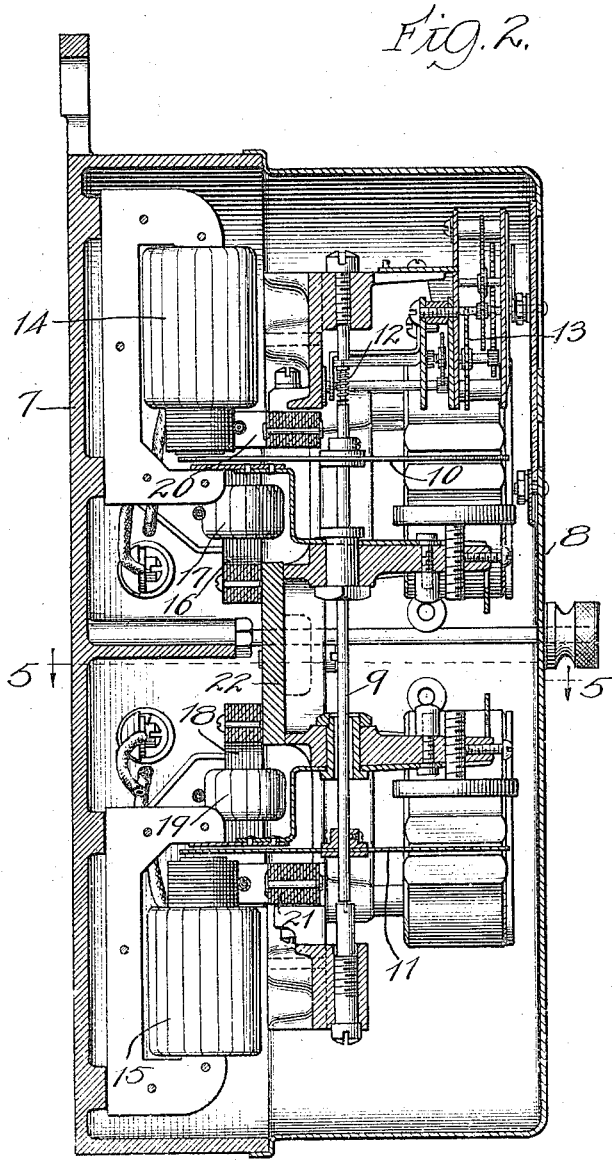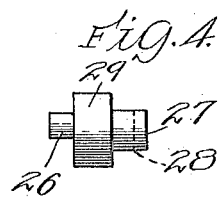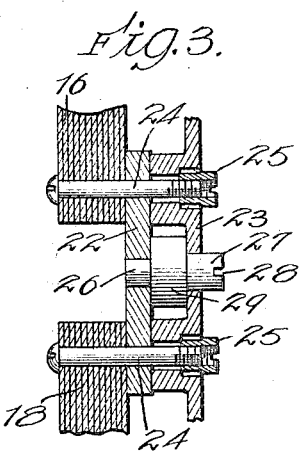

J. H. HODDE & O. WHITE.
POLYPHASE WATT HOUR METER.
APPLICATION FILED MAR. 12, 1913.

1,260,381.

Patented Mar. 26, 1918.
3 SHEETS—SHEET 3.

Witnesses:
G. H. Domarus Jr.
R. Bauerle

Inventors
Jacob H. Hodde.
Otis White.
by Adams & Jackson
Attys.

UNITED STATES PATENT OFFICE.

JACOB H. HODDE AND OTIS WHITE, OF SPRINGFIELD, ILLINOIS, ASSIGNORS TO SANGAMO ELECTRIC COMPANY, OF SPRINGFIELD, ILLINOIS, A CORPORATION OF ILLINOIS.

POLYPHASE WATT-HOUR METER.

1,260,381.　　　　　　Specification of Letters Patent.　　Patented Mar. 26, 1918.

Application filed March 12, 1913. Serial No. 753,723.

*To all whom it may concern:*

Be it known that we, JACOB H. HODDE and OTIS WHITE, both citizens of the United States, residing at Springfield, in the county of Sangamon and State of Illinois, have invented certain new and useful Improvements in Polyphase Watt-Hour Meters, of which the following is a specification, reference being had to the accompanying drawings.

Our invention relates to induction type watthour meters and particularly to the type commonly known as polyphase meters in which two torque producing elements are employed to drive a single shaft connected to the usual recording train. In such meters it is most important that the torque of each disk or driving element should be exactly the same for a given load on each phase of the circuit to which the meter is connected, and heretofore it has been customary to obtain an exact equality in torque of the two driving elements by varying the strength of the shunt or series field magnets of one or the other of said elements. This necessitates taking down the meter and changing the windings, which is, of course, objectionable. The object of our invention is to avoid the objections to the former practice by providing means by which the torque of the respective driving elements may be varied as necessary to maintain a balance of said two elements without making any change of the windings or taking down the meter. We have discovered that the desired object may be accomplished by inversely varying the air gaps in the two series magnetic circuits, and our invention resides in means by which this may readily be accomplished.

In the accompanying drawings in which we have illustrated a simple and convenient construction for attaining the desired result,—

Fig. 2 is a longitudinal vertical section of the meter shown in Fig. 1;

Fig. 3 is a detail illustrating the devices by which the adjustment of the series field magnet cores is effected;

Fig. 4 is a detail of the eccentric which forms a part of the mechanism shown in Fig. 3;

Referring to the drawings,—

Figure 1:
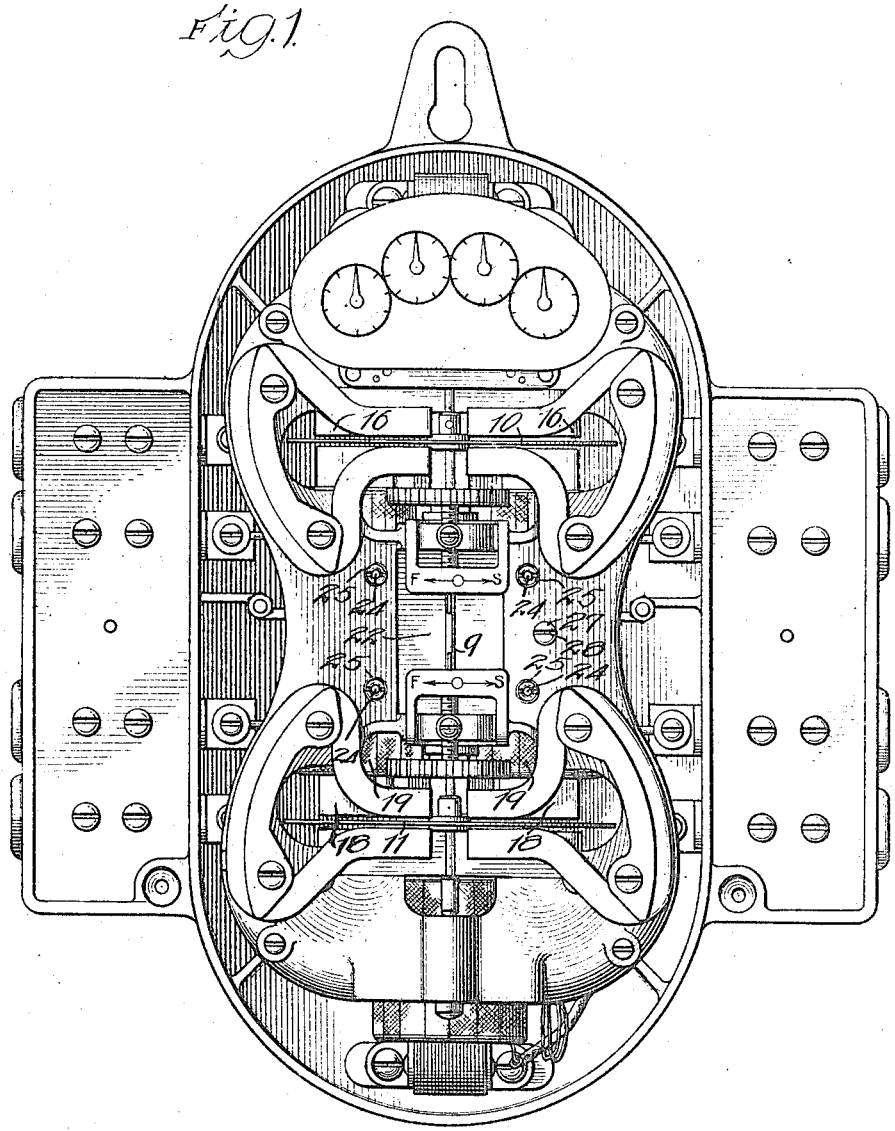
Figure 1 is a front view of a polyphase meter, the cover being removed.
Figure 5:
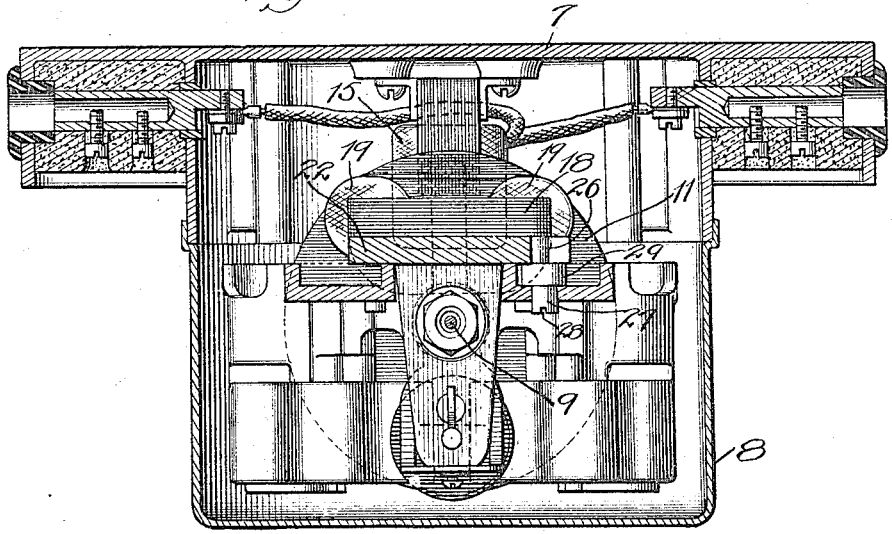
Fig. 5 is a cross-section on line 5—5 of Fig. 2.
Figure 6:
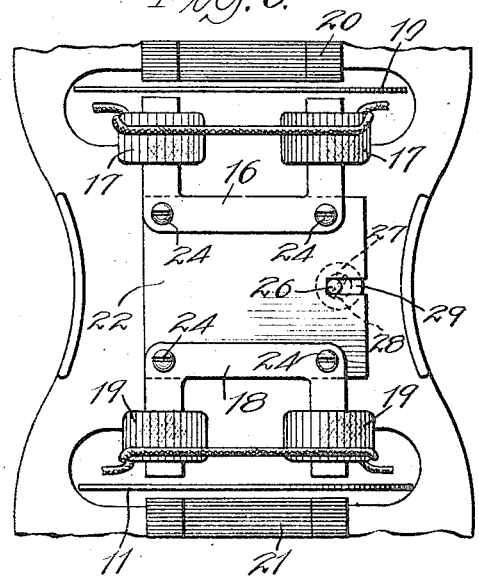
Fig. 6 is a partial elevation of the meter showing the series field magnet cores and the devices for adjusting them.

7 indicates the base or grid which carries the various parts of the meter, and 8 the usual cover which incloses such parts. 9 indicates the main drive shaft which carries two driving disks 10—11, and is provided with a worm 12, through which the usual recording train 13 is driven. Each driving disk or armature 10—11 forms a part of a driving element, each of which has the general characteristics of construction of the meter shown and described in Letters Patent, No. 1,010,272, issued to Robert C. Lanphier November 28, 1911, so that they need not be described in detail here. It will be sufficient to say that each armature is operated by a pair of shunt field magnets and a pair of series field magnets having laminated iron return plates on the opposite side of the disk from their respective cores. As shown in Fig. 2, 14 indicates the pressure or shunt field magnet of the armature 10, and 15 the shunt field magnet of the armature 11, the latter being arranged oppositely to the shunt field magnet 14. 16 indicates the U-shaped core and 17 the windings of the series field magnets of the armature 10, and 18 indicates the U-shaped core and 19 the windings of the series field magnets of the armature 11, the series field magnets being also oppositely arranged with reference to each other. 20 indicates a laminated iron return plate or return magnetic path arranged above the armature 10 over the core 16, and 21 indicates a similar return plate arranged below the armature 11 and opposite the core 18. It will be apparent that by connecting the cores 16 and 18 together and moving them in unison longitudinally of the shaft 9, the air gaps between the cores 16—18 and their respective return magnetic paths 20—21 may be varied inversely; that is to say, by moving said cores upward, the upper air gap will be narrowed while the lower one is widened, and vice versa, thus inversely independently of the shunt magnets varying the torque of the two driving elements accordingly and without altering the air gaps of the two shunt magnets. This is accomplished by connecting the two cores 16—18 to the opposite marginal portions of a plate 22, best shown in Figs. 2, 3 and 6, and providing means for moving said plate longitudinally of the shaft 9. The adjusting plate 22 bears against a support 23 which is part of the main frame of the meter, and it is secured thereto by bolts 24, which also serve to secure the cores 16—18 to the adjusting plate, as shown in Figs. 3 and 6, said bolts being provided with nuts 25 which are on the exposed face of the support 23 so that they are readily accessible. By loosening the nuts 25 the adjusting plate 22 may be moved slightly longitudinally of the shaft 9 to carry the cores 16—18 in one direction or the other, as the passages in the support 23 through which the bolts 24 project are made large enough to allow the desired movement. The plate 22 is moved in one direction or the other by means of an eccentric stud 26, carried by a short shaft 27, which projects through the outer face of the support 23 and is grooved, as shown at 28 in Fig. 3, so that it may be conveniently turned by a screw-driver. The inner portion of the shaft 27 is enlarged, as shown at 29 in Fig. 3, to provide an extended bearing for the shaft and to hold it in position. It will be apparent from the foregoing description that by rotating the shaft 27 the eccentricity of the stud 26 will operate as a micrometric adjusting device to shift the adjusting plate 22 to move the cores 16—18 simultaneously either up or down, thereby either reducing the width of the air gap between the upper series magnet core and its return plate and increasing the width of the air gap between the lower series magnet core and its air gap, or the opposite, thus varying the air gaps of the two series magnetic circuits and correspondingly varying the torque of such elements and this without varying the air gaps of the shunt magnets, thus avoiding varying the inductance and therefore the phase angle of the magnetic fields of said magnets, which would be objectionable as it would necessitate an entire readjustment of the compensation for inductive load. When the proper balance of the two elements is attained, the adjusting plate 22 may be clamped in position. Thus the desired adjustment may be very quickly and accurately made without changing the windings or any of the mechanical parts.

It will be understood that our invention is not restricted to using the precise construction shown and described, as the adjustment of the cores may be provided for in various other ways. The claims hereinafter made are, therefore, to be construed generically, except in so far as they are directed to specific features of the construction shown and described.

That which we claim as our invention, and desire to secure by Letters Patent, is,—

1. A polyphase meter of the type described, having a driving member comprising two armatures mounted on a common shaft, actuating elements for said armatures, each comprising a stationary shunt magnet and a series field magnet movable toward and from its armature, means for simultaneously moving said series field magnets inversely with relation to their respective armatures, the said elements being so disposed that the adjustment of said series field magnets does not materially alter the armature traversing flux of the shunt magnets.

2. A polyphase meter of the type described, having a driving member comprising two armatures mounted on a common shaft, actuating elements for said armatures, each comprising a stationary shunt magnet and a series field magnet movable toward and from its armature, means for simultaneously moving said series field magnets inversely with relation to their respective armatures, the said elements being so disposed that the adjustment of said series field magnets does not materially alter the armature traversing flux of the shunt magnets, and micrometric adjusting means for adjusting the position of said series field magnets.

JACOB H. HODDE.
OTIS WHITE.

Witnesses:
CHAS. G. LANPHIER,
J. A. SCHIMENZ.